(12) United States Patent
Sankarasubramaniam et al.

(10) Patent No.: US 8,593,697 B2
(45) Date of Patent: Nov. 26, 2013

(54) DOCUMENT PROCESSING

(75) Inventors: Yogesh Sankarasubramaniam, Bangalore (IN); Krusheel Munnangi, Bangalore (IN); Serene Banerjee, Bangalore (IN); Anjaneyulu Seetha Rama Kuchibhotla, Bangalore (IN); Abhishek Chakraborty, Bangalore (IN); Nagabhushana Ayyanahal Matad, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 12/758,813

(22) Filed: Apr. 13, 2010

(65) Prior Publication Data

US 2011/0170144 A1    Jul. 14, 2011

(30) Foreign Application Priority Data

Jan. 11, 2010   (IN) ................. 71/CHE/2010

(51) Int. Cl.
*H04N 1/40*   (2006.01)

(52) U.S. Cl.
USPC ......... 358/3.28; 358/3.31; 709/228; 709/202; 709/205

(58) Field of Classification Search
USPC ........................................... 358/1.9
See application file for complete search history.

(56) References Cited

U.S. PATENT DOCUMENTS

| | | | |
|---|---|---|---|
| 5,091,966 A | 2/1992 | Bloomberg et al. | |
| 5,304,786 A | 4/1994 | Pavlidis et al. | |
| 5,315,098 A | 5/1994 | Tow | |
| 5,399,846 A | 3/1995 | Pavlidis et al. | |
| 5,453,605 A | 9/1995 | Hecht et al. | |
| 5,459,307 A | 10/1995 | Klotz, Jr. | |
| 5,486,686 A | 1/1996 | Zdybel, Jr. et al. | |
| 6,000,613 A | 12/1999 | Hecht et al. | |
| 6,070,805 A | 6/2000 | Kaufman et al. | |
| 6,076,738 A | 6/2000 | Bloomberg et al. | |
| 6,134,338 A * | 10/2000 | Solberg et al. | 382/113 |
| 6,327,395 B1 | 12/2001 | Hecht et al. | |
| 6,641,053 B1 | 11/2003 | Breidenbach et al. | |
| 6,655,592 B2 | 12/2003 | Shaked et al. | |
| 6,708,894 B2 | 3/2004 | Mazaika | |
| 6,722,567 B2 | 4/2004 | Shaked et al. | |
| 6,751,352 B1 | 6/2004 | Baharav et al. | |
| 6,915,020 B2 | 7/2005 | Damera-Venkata et al. | |
| 2005/0199721 A1 | 9/2005 | Chang et al. | |
| 2005/0284944 A1 | 12/2005 | Ming | |
| 2005/0285761 A1 | 12/2005 | Jancke | |
| 2006/0104475 A1 | 5/2006 | Jancke | |
| 2006/0196950 A1 | 9/2006 | Kiliccote | |
| 2006/0202470 A1 | 9/2006 | Simske et al. | |
| 2007/0024915 A1 | 2/2007 | Simske et al. | |
| 2008/0197197 A1 | 8/2008 | Simske et al. | |
| 2010/0002032 A1* | 1/2010 | Yi et al. | 347/9 |

* cited by examiner

*Primary Examiner* — Twyler Haskins
*Assistant Examiner* — Brendan McCommas

(57) ABSTRACT

Proposed is the use of a document widget for representing a property of a document. The document widget comprises: a human-readable portion for interpretation by a user; and a machine-readable portion representing the document property. By comprising information about a property of a document, a document widget may be processed in accordance with an optical recognition process so as to identify the document widget and enable extraction of the document property.

13 Claims, 7 Drawing Sheets

$$\begin{bmatrix} 1 & 1 & 0 & 1 \\ 0 & 1 & 1 & 0 \\ 1 & 0 & 1 & 1 \\ 1 & 1 & 0 & 1 \end{bmatrix}$$

FORM

INVOICE NO : 102345672   [#]   DATE : 01/01/2008   [d]

| S. NO. | NAME | ADDRESS | ACCOUNT TYPE | ACCOUNT NO. | BRANCH ADDRESS | 9-DIGIT CODE |
|---|---|---|---|---|---|---|
| 1. | ABC IJK | ABC CITY | SAVINGS | 123489576 | IJK | 100004523 |
| 2. | XYZ IJK | XYZ CITY | CURRENT | 112000452 | IJK | 137288332 |
| 3. | DEF RST | DEF CITY | SAVINGS | 145883349 | AAA | 236748392 |
| 4. | DFE LMM | AAA CITY | SAVINGS | 145881234 | HGH | 362781921 |
| 5. | UVW QRS | CRF CITY | CURRENT | 123481128 | IJK | 111234589 |
| 6. | HGH ARC | ARE CITY | CURRENT | 112006767 | IJK | 100004523 |
| 7. | FGR WQS | GYH CITY | SAVINGS | 112045678 | HGH | 100057437 |

NOTE:
1. ALL ACCOUNT INFORMATION IS VALID ONLY DURING THE PRESENT FINANCIAL YEAR
2. THE INFORMATION MAY BE UPDATED WITHOUT PRIOR INTIMATION
3. ALL RIGHTS RESERVED BY THE AUTHORITY OF BANK

ADDITIONAL INFORMATION :

NAME : ABCDEF XYZIJK   [n] — 503
DATE OF BIRTH : 01/01/1980
OCCUPATION : TECHNICIAN   [d] — 504
SEX : M ☐   ☐ F
ADDRESS : PLOT NO. 123, ABC STREET, XYZ CITY

PIN CODE : 0 0 0 0 0 0

SIGNATURE OF ACCOUNT HOLDER          SIGNATURE OF BANK MANAGER

FOR FURTHER INFORMATION,
PLEASE REFER TO WWW.XYZ.ABC   [w]   OR EMAIL AT
ABC@IJK.AB

FIG. 5

DOCUMENT PROCESSING

Benefit is claimed under 35 U.S.C. 119(a)-(d) to Foreign application Serial No. 71/CHE/2010 entitled "DOCUMENT PROCESSING" by Hewlett-Packard Development Company, L. P., filed on Jan. 11, 2010, which is herein incorporated in its entirety by reference for all purposes.

Processing a document to extract information contained in the document for subsequent entry and storage in a digital storage system is a common problem faced by enterprises. For example, the cost of processing a physical document is estimated to be ten times the cost of producing the same document. Problems that are typically encountered relate to the time and effort involved in extraction of information, entry into a digital system and subsequent verification of the information. The additional effort involved in processing the document may also result in additional costs being incurred.

It is known to encode information in a machine-readable format so that the information can be later decoded and extracted by a digital system. Various techniques for encoding information into a machine-readable format are known and typically comprise encoding information into a one-dimensional (1D) or two-dimensional (2D) pattern. However, such techniques are not designed to be human-readable, are not designed for distributed placement or may require the use of special decoding devices.

BRIEF DESCRIPTION OF THE EMBODIMENTS

Embodiments are described in more detail and by way of non-limiting examples with reference to the accompanying drawings, wherein FIG. 1 is a flow diagram illustrating a method according to an embodiment;

FIG. 5 shows a document comprising a plurality of document widgets according to an embodiment;

DETAILED DESCRIPTION OF THE DRAWINGS

Figure 1:
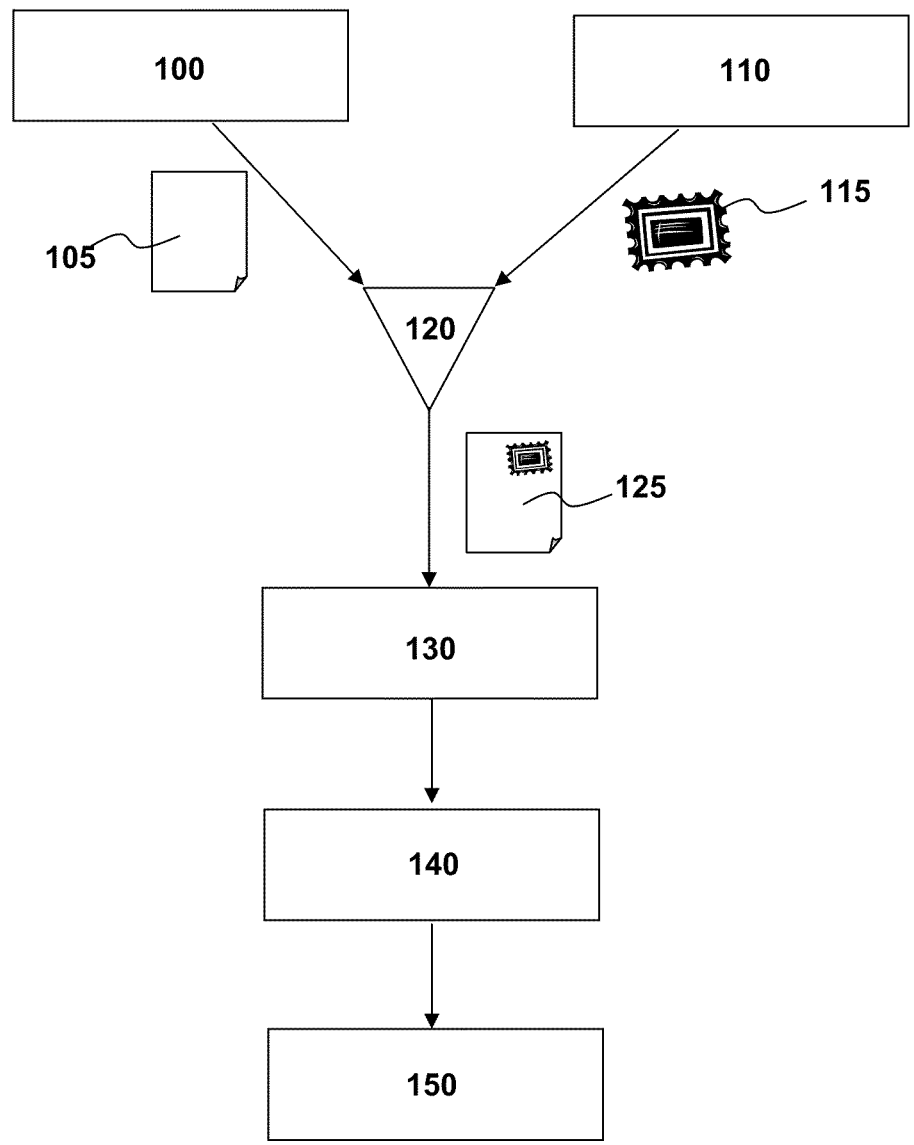

It should be understood that the FIGS. are merely schematic and are not drawn to scale. It should also be understood that the same reference numerals are used throughout the FIGS. to indicate the same or similar parts.

Proposed is the use of what is referred to hereinafter as a "smart widget" or a "document widget" for representing properties of a document. By being printed on a document and comprising information about the document, a document widget may be processed in accordance with an optical recognition process so as to identify document properties and enable document information to be automatically extracted.

Such document widgets comprise a human-readable element or portion that provides for a distinction between different document widgets that can be identified by a person who sees the widgets. The human-readable element provides human-readability enabling a human reader to identify the existence of a widget and the type of document property encoded by the machine-readable portion of the widget.

Embodiments use machine-readable document widgets that can be printed on paper documents which may help alleviate or reduce the problems associated with transferring a paper document into a digital format.

The document widgets may be designed to encode relatively small amounts on information (in the order of 10 s of bytes) in a small footprint area (such as less than a square centimeter). By being of a relatively small size, the document widgets may be positioned within a document as desired (for example, adjacent or proximate information of interest). This may be referred to as the 'distributed placement' of document widgets, which helps to provide context and meaning to the document widgets when interpreted by a human. Document widgets may then be selectively processed according to a human user's requirement, avoiding the drawback of conventional methodologies which require all of the machine readable code provided in a document to be processed in order to gain an understanding of what information is encoded.

Further, the document widgets may be adapted to be efficiently extracted from scanned documents using digital image processing techniques. This may enable extraction of document information using digital image processing techniques that can be embedded in a digital imaging device such as a scanner or digital camera.

Document widgets can also have a digital incarnation so that they can be dynamically modified, created and used as a part of document creation workflow and finally printed on a paper document. Conversely, a scanned document widget can lead to the digital incarnation which is updated and then finally printed at the end of a workflow.

A document widget may comprise a human-readable portion (such as an image or an alpha-numeric character) and machine readable portion information about a document embedded/encoded therein. Thus, embodiments enable a user to compose a document on paper and then print or stick a document widget on the paper to create a 'smart document'. Using an image capture device, an electronic representation of the smart document may be created and the electronic representation can then be processed using image recognition hardware/software to identify the information about the document from the document widget. Thus, document information can be automatically extracted and stored. The human-readable element helps since it may provide a 'namespace' identifying the machine readable portion and may allow a user to know the type of content encoded by the widget even before decoding it. This may be particularly useful when there are several widgets and a user only wants to selectively extract certain information from a paper document.

For many people, writing on paper feels more natural than typing and so may be a preferred method for composing a document. Embodiments enable information about the document to be combined with, printed onto, or embedded into a paper document, therefore allowing people to compose a document on paper which can then be processed by a digital system. Information such as the bounding box coordinates of a handwritten field to be extracted from the paper document can therefore be provided with the document.

Embodiments provide a document processing system which enables a person to compose a document on paper including one or more document widgets, capture the document with an image capture device, and process the document to extract document information, all without requiring knowledge of at least part of the document information and/or a document processing program. Embedding document information as machine readable code removes the need to store information regarding the links between an image and associated document information.

A system according to an embodiment may comprise the following three main components: a document widget generation unit for creating a document widget; an image capture unit for capturing an image of a document comprising a document widget; and an image processing unit for processing the captured image to extract document information from the document widget.

For example, the image processing unit may be a suitably arranged desktop PC, laptop, or mobile telephony device phone. The image capture unit may be a camera and scanner, and the document widget generation unit may be a printer. Also, it is to be appreciated that any combination of these components may be integrated within a single device. For example, the image capture unit and image processing unit may be provided by a single mobile telephony device or a laptop having a webcam. Similarly, the document widget generation unit and the image capture unit may be provided by a combined printer and scanner device. It will therefore be understood that a conventional image capture device may be used in conjunction with hardware and/or software according to an embodiment so as to extend the use of the conventional image capture device to document widget generation or processing.

Further, all three components may also be provided in a single device such as a combined printer and scanner device having an integrated image processing unit. Accordingly, embodiments can be provided by a standalone device.

Referring now to FIG. 1, a method according to an embodiment will now be described.

Firstly, in step 100, a user composes a document. The document is composed by writing on an item of stationery, such as a piece of paper. Thus, completion of step 100 results in a physical document 105.

The generation may also be part of a batch process and need not be interactive so that, once the widgets are defined, every document being produced by the batch process would also be able to generate the widgets. In step 110 a document widget representing properties of the document is generated. Here, a user specifies the document properties, such as the author, tile and subject matter using a document widget generation unit, which then generates a document widget and prints the document widget 115 on an adhesive piece of paper. The document widget 115 may also be printed onto a paper document along with the document content, therefore not requiring to be printed on an adhesive piece of paper.

Next, in step 120, the document widget 115 is combined with the physical document 105 by sticking the document widget 115 onto the document. This creates a document 125 which can be used by embodiments to automatically extract the document information represented by the email stamp 115. The document 125 created by combining the physical document 105 with the email stamp 115 may therefore be referred to as a smart document 125 for data processing.

In step 130, an electronic representation of the smart document 125 is generated using image capturing means such as a scanner or digital camera. Next, in step 140, the electronic representation is processed in accordance with an optical recognition process so as to identify the document widget 115. The recognition process identifies the existence of the document widget 115 within the electronic representation of the smart document 125 and then determines the document information. Determination of the document information is, for example, undertaken by accessing a data store which stores information regarding associations between document widgets and document information. Where the document widget has been generated so as to comprise document information in a machine readable code format, the document information is determined by extracting the document information from the document widget (for example, by decoding the machine readable code).

Finally, in step 150, the extracted information is processed and stored by a processing unit. Since the document content is provided by the electronic representation of the smart document 125 and the document information has been identified in step 140, the document contents and information can be processed and stored automatically without the user being required to specify details of the document using a document/data processing program. Aspects of proposed embodiments will now be described separately as follows.

Document Widget Generation

Different approaches may be used to generate a document widget in accordance with embodiments. One approach is to generate a document widget that provides for human-readability on small footprint area, while at the same time ensuring robustness against printing and scanning distortions. This is achieved by using a Binary Constrained Double-triangular Toeplitz (BCDT) structure to generate a document widget that can store, for instance, 10 bytes of data within an area of 0.5 square centimeters (sq. cm.).

A Toeplitz structure is a square matrix in which each descending-diagonal from left to right is a constant. One example of a binary Toeplitz matrix is shown as FIG. 2A. A double-triangular structure may be further used on top of the Toeplitz structure to double the storage capacity.

Figures 2A, 2B:
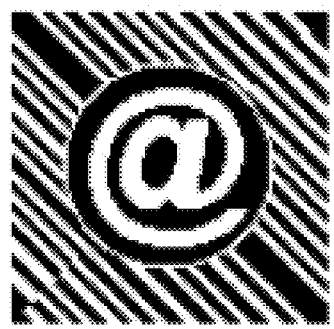
FIG. 2A shows an example of a binary Toeplitz matrix.
FIG. 2B shows a document widget according to an embodiment.

A double-triangular Toeplitz matrix is defined as a square matrix in which the upper left and lower right triangular matrices are Toeplitz structures. Such a Toeplitz structure may be utilized for widget extraction and decoding. An example of such a BCDT-based email document widget is shown in FIG. 2B. This is a magnified version of an email document widget that will be shown in an example below (see FIG. 5).

The main considerations when using a BCDT according to an embodiment are: (a) human-readability; and (b) print-scan inter-symbol interference (ISI). The illustrated embodiment addresses these considerations by using the central portion of the document widget area for a base icon which offers a human-readable visual meaning to be portrayed by the document widget. Here, the base icon '@' conveys that the document widget contains information relating to one or more email addresses. The remaining portion of the widget area contains the encoded data in a machine readable format.

To address print-scan ISI, constrained coding techniques with minimum run length of 3 are used. A maximum run length constraint of 5 may also be used so that the widget extraction can be performed using Gabor filters matched to the allowed run lengths 3, 4, 5 (see the section entitled "Document widget Extraction" below). A rate 1/3 code that maps input bits to run length-constrained outputs (where B denotes a black pixel and W denotes a white pixel) can be defined as detailed in Table 1 below.

TABLE 1

|  | Previous Output | | | | | |
|---|---|---|---|---|---|---|
| Input | BBB | WWW | BWW | WBB | WWB | BBW |
| 0 | BWW | BBB | WBB | BBW | BBB | WWB |
| 1 | WWW | WBB | WWB | BWW | BBW | WWW |

It can be verified that the output sequence has B/W runs only of allowed lengths 3, 4, or 5, for any input bit sequence. Note that the code has a memory of three output symbols, which can be modeled and implemented as a state machine. Also, since the allowed run lengths are only 3, 4, and 5, marker sequences of 6 Bs can be inserted to identify the widget corners during decoding.

In addition to the constrained code that avoids print-scan ISI, embodiments also use an error correcting code (Reed-Solomon (RS) code) to protect against print-scan errors. The constrained code and RS code work together to provide robustness against printing and scanning distortions. Furthermore, to improve widget extractor accuracy, the central area around the base icon is made circular. This improves the Gabor filter response as detailed in the section entitled "Document Widget Extraction" below. Finally, a document widget may be encompassed by a 3-pixel-wide quiet zone that helps distinguish the widget from any document background.

Document Widget Printing

After document widget generation, the widget can be printed out for future use in document creation. For example, a document widget may be printed onto to adhesive paper so as to provide a sticker which can be stuck onto stationery. Alternatively, a document widget may be printed onto stationery, thereby providing stationery, referred to as smart-paper or smart-stationery, which is adapted to be automatically processed and provide information encoded by the widget when scanned or photographed by a device according to an embodiment.

Widget Extraction

A widget extractor module is adapted to provide for detection and extraction of document widgets from scanned documents. The Toeplitz structure of document widgets according to an embodiment provides spatially localized spectral features which may be utilized in widget detection. A Gabor filtering-based approach may be utilized for extracting these spatially localized spectral features.

The traditional Gabor filter is a sinusoidal signal of particular frequency and orientation that is modulated by a Gaussian envelope. For accurate widget extraction, sinusoids of frequencies $\frac{1}{3}$, $\frac{1}{4}$, $\frac{1}{5}$, and $\frac{1}{6}$ are chosen. The absolute values of the response of the four filters are summed and normalized to get the final response. As the widgets contain black and white stripes, the Gabor filter response at the widgets is subsequently higher than any response coming from the document textures or print-scan variations.

Figure 3:
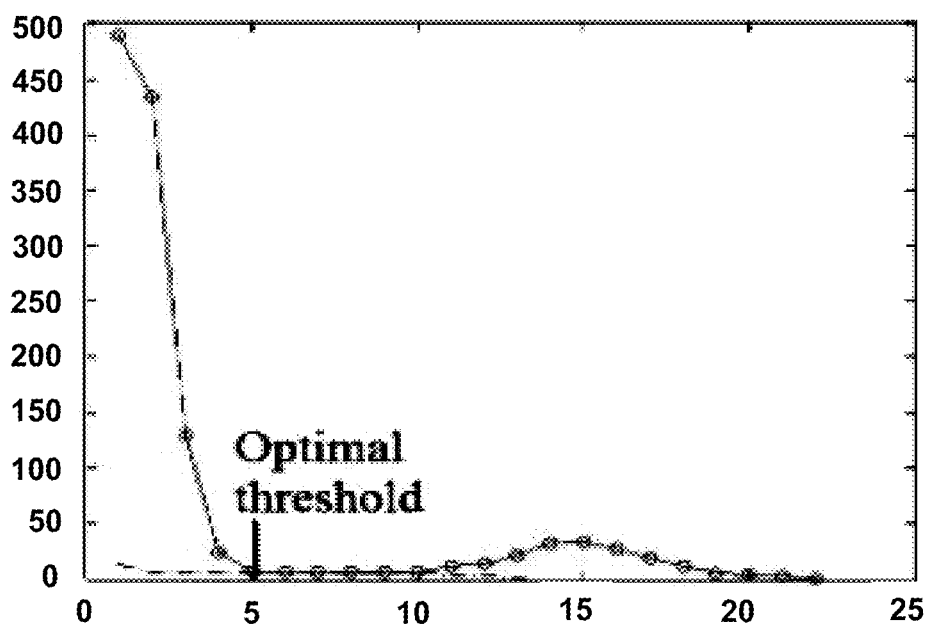
FIG. 3 is a graph of absolute difference of a number of components extracted and the number of squares extracted plotted against threshold value to illustrate how a threshold value may be determined for extraction of a document widget.

One can adaptively threshold the Gabor filter response in order to robustly detect a document widget. At an optimal threshold, the number of squares detected attains a plateau, and the difference between the number of connected components extracted, and the number of squares detected attains a minimum. Referring to FIG. 3, this approach entails calculating, for up to 20 threshold values between the mode and the maximum of the Gabor filter response, a corresponding absolute difference of the number of components extracted and the number of squares extracted attained and these values are plotted on a graph. The optimal threshold is identified where the graph attains its first minima. This helps to choose an appropriate threshold values which enables the detection and extraction of widgets in the document, irrespective of background textures or print-scan variations.

After choosing the appropriate threshold value, a morphological closing operation is performed to fill the gaps with a circular structural element of six pixels. Here, we note that the region around the base icon is circular, where there is no Gabor filter response. Since the circular structure allows maximum surface area for the regions having Gabor filter response, the structuring element of six pixels is sufficient to close the gaps and the widgets are extracted as square connected components. This parameter can be adaptively tuned to the document image resolution.

To reduce the computational complexity of Gabor filtering, the filtering can be undertaken on a downsized image. The location of the widgets in the original resolution image is further tuned utilizing the three-pixel wide quite zone in the image. For each of the connected components, the horizontal and the vertical projection profile is found to locate the quiet zone around the columns and rows, respectively. If the quiet zone is not found in either the top, right, bottom or left boundaries, the widget boundary is appropriately adjusted to include the quiet zone.

Document Widget Decoding

After the extraction of the widget from a scanned document, a widget decoder can be used to recover the information stored by the widget.

Figure 4:
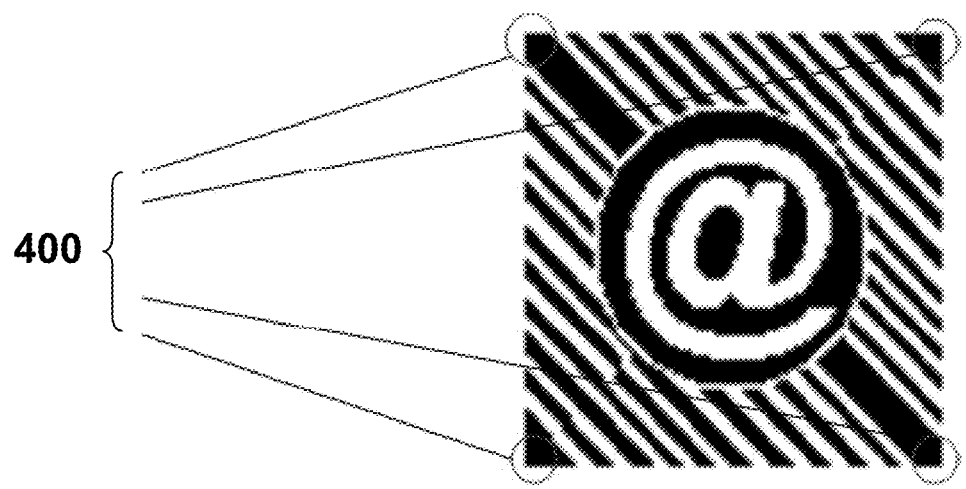
FIG. 4 illustrates marker sequences used to identify the corners of the document widget of FIG. 2B.

Firstly, the four corners 400 of the widget are detected using the marker sequences of six Bs as shown in FIG. 4. Decoding thresholds for B (black) and W (white) pixel levels are estimated using auto-calibration from the marker sequences. This may take into account the effects print-scan processes so as to support working across all printers and scanners.

Since the widget is a BCDT (Binary Constrained Double-triangular Toeplitz) structure, it contains some redundancy, and only a few rows and columns need to be decoded in order to recover all of the encoded data. This allows for simple, yet robust decoding.

Along each dimension (both rows and columns) of the widget, the following sets of steps are repeated to obtain the encoded data along that dimension.

(i) An estimate of the value of the pixel is obtained using bilinear interpolation. At this step the number of pixels in each dimension is assumed to be known. Each value is classified as either white or black by comparison against the white and black thresholds obtained from auto-calibration. At this step, due to the print scan distortions, some values may alternatively be classified as being neither black nor white which can later be corrected based on the conditions described in the next two steps.

(ii) After the initial classification of the values as black or white (or being neither), the sequence obtained is checked for any run length violations i.e. all the run lengths should satisfy the constraint that they should be between 3 and 5 as mentioned in the encoder section above. Values that are neither black nor white are classified as white or black or kept as neither depending on the run lengths.

(iii) Once the run length constraints are checked, values that are still classified as neither black nor white are classified based on the difference sequence of the values. This is undertaken based on the observation that there is a unique pattern in the difference sequence for black to white transition sequence and white to black transition.

(iv) Viterbi decoding is then used to correct errors and resolve the unclassified bits of individual row or column data after step (ii) and (iii). A decoding table for such a Viterbi decoder for the run length encoder used is shown in Table 2 below.

TABLE 2

| Previous Sequence | Current Sequence\Output | Current Sequence\Output |
|---|---|---|
| BBB | BWW\0 | WWW\1 |
| WWW | BBB\0 | WBB\1 |
| BWW | WBB\0 | WWB\1 |
| WBB | BBW\0 | BWW\1 |
| WWB | BBB\0 | BBW\1 |
| BBW | WWB\0 | WWW\1 |

(v). Data from the two rows and columns are then consolidated to obtain the encoded data, to be decoded by the RS decoder for extracting the data stored in the widget.

Referring now to FIG. 5, examples of document widgets and their use will now be described.

A document 500 comprises first 501 to eighth 508 document widgets positioned at various locations in the document 500. Each document widget comprises a human-readable portion and a computer-readable portion. Here, the human-readable portion comprises a base icon situated at the centre of the document widget which is adapted to indicate a purpose/use of the document widget to a human user/reader of the document. The computer-readable portion comprises machine-readable code surrounding the human-readable portion (i.e. the base icon) and contains encoded information about the document. The specific document information encoded by the machine-readable code depends on the purpose/use of the document widget (as will now be shown through illustration of the different document widgets in the document 500 of FIG. 5).

First 501 and fourth 504 document widgets in the document 500 of FIG. 5 are date widgets and each positioned adjacent to respective date information fields in the document 500. Each date widget 501 and 504 has a base icon comprising the letter "d" to indicate that the widget is a date widget for representing date information. Each date widget 501 and 504 also comprises machine-readable code representing date information which can be checked against date information provided in the respective adjacent date field. For example, the machine-readable code of the first widget 501 comprises encoded information representing the creation date of the document 500. This should match the date provided in the date field adjacent the first widget 501 and so can be used to check against business logic when the document is scanned.

The second document widget 502 in the document 500 is an invoice number widget 502 which is positioned adjacent to a respective invoice number field 510 in the document 500. The invoice number widget 502 has a base icon comprising the symbols "i#" to indicate that the widget is an invoice number widget for representing an invoice number. The invoice number widget 502 also comprises machine-readable code representing the invoice number which can be checked against invoice number provided in the adjacent invoice number field. For example, the machine-readable code of the invoice number widget 502 comprises encoded information representing an automatically created invoice number for the document 500 according to an invoice number database. This should match the invoice number provided in the invoice number field adjacent the second widget 502 and therefore can be used to check against business logic when the document is scanned.

The third document widget 503 in the document 500 is a name widget 503 which is positioned adjacent to a respective name field in the document 500. The name widget 503 has a base icon comprising the letter "n" to indicate that the widget is a name widget for representing name information. The name widget 503 also comprises machine-readable code representing a name which can be checked against name information provided in the adjacent name field. For example, the machine-readable code of the name widget 503 comprises encoded information representing a name according to a client database. This should match the name information provided in the name field adjacent the third widget 503 and therefore can also be used to check against business logic when the document is scanned.

Fifth 505 and sixth 506 document widgets in the document 500 of FIG. 5 are signature widgets and each positioned adjacent to first 511 and second 512 signature fields, respectively, in the document 500. Each signature widget 505 and 506 has a base icon comprising the letter "s" to indicate that the widget is a signature widget for representing signature information. The signature widgets 505 and 506 also comprise machine-readable code representing the relative coordinates of the first 511 and second 512 signature fields, respectively. For example, the machine-readable code of the fifth widget 505 comprises encoded information representing the relative location of the first signature field 511. The fifth widget 505 can therefore be used to verify whether the document has been signed at the location of the first signature field 511, thereby enabling real-time verification of the presence of a signature at a predetermined location in the document 500. Similarly, the machine-readable code of the sixth widget 506 comprises encoded information representing the relative location of the second signature field 512 and can therefore be used to verify whether the document has been signed at the location of the second signature field 512 when the document 500 is scanned and processed according to an embodiment.

The seventh document widget 507 in the document 500 is a web address widget 507 which is positioned adjacent to a respective web address (or URL) in the document 500. The web address widget 507 has a base icon comprising the letter "w" to indicate that the widget is a web address widget for representing a URL of a web page. The web address widget 507 also comprises machine-readable code representing the web address which can be used to automatically generate a link to the web address of the web page. For example, the machine-readable code of the web address widget 507 comprises encoded information representing the web address of the web page which provides further information regarding term and conditions applicable to the document 500. When the document is scanned, the web address widget 507 can be used to generate a hyperlink to the web address specified by the web address widget 507 which enables a user to simply click on the hyperlink in order to navigate to the web page without being needed to manually open a web browser program and type the web address into an address bar of the web browser program.

The eighth document widget 508 in the document 500 is an email address widget 508 which is positioned adjacent to a respective email address field 513 in the document 500. The email address widget 508 has a base icon comprising the icon "@" to indicate that the widget is an email address widget for representing an email address. The email address widget 508 also comprises machine-readable code representing the relative coordinates of the email address field 513 which can be used to automatically generate a link to the email address. For example, when the document is scanned, the email address widget 508 can be used to generate a hyperlink to the email address specified by the email address field 513. The generated hyperlink then enables a user to simply click on the hyperlink in order to compose an email address to the email address specified by the email address field 513 without requiring the user to manually open an email program and type the email address into an address bar of the email program.

After scanning, the document widgets may also have a digital representation, for example, as another layer of the document in addition to the image of the document. This would enable software that processes digital images to also process the paper widgets, and be able to modify them suitably, without processing/modifying the image of the document.

The following examples illustrate the use of particular embodiments:

EXAMPLE 1

A customer goes to an enterprise website and enters online information in a pre-structured form (for example an income tax return form). As a part of the process, the customer is expected to print the form, sign it, and attach supporting documents and send the physical documents to the enterprise for completing the transaction. These forms when printed with widgets allow the scanning workflow of the enterprise to automatically extract fields of interest and compare them with the online submitted information prior to further processing.

EXAMPLE 2

An enterprise prints forms that need to be filled-in and submitted by the customer (for example loan application forms). These are printed with widgets so that certain fields on the form such as the signature fields, date fields, etc can be automatically identified and processed as a part of a document processing workflow once the forms are submitted. The processing could include checking if signatures have been made, extracting handwriting and carrying out recognition processes on the extracted handwriting.

EXAMPLE 3

An enterprise receives several documents from its vendors (such as invoices). These need to be processed by an accounts payable workflow of the enterprise. The invoices have document widgets printed on them (based on templates or tools provided by the enterprise to the vendor). This enables parts of the workflow in the enterprise to be automated where manual transcription would otherwise typically be required.

EXAMPLE 4

A common problem faced by financial institutions is real-time verification of the presence of customer signatures on all pages of submitted forms. Conventionally, this is undertaken manually or using backend software which is not real-time. Document widgets according to an embodiment can be used to perform real-time signature detection through identification of signature fields where one or more signatures are expected, thus saving re-routing overhead.

EXAMPLE 5

Another potential application is with handheld All-in-One (AiO) printers and mail packages. Each mail package, depending on the manufacturing process, may have a code that ties it back to a location, date, batch, and machine that it was manufactured by. Document widgets could be used in the packaging process using the AiO printer to label the box with that same data as the mail package is filed. As a document widget can store data in a smaller area than a traditional barcode, it enables the AiO to potentially put more than one widget on a tag to be scanned at a later date. This unique data then makes this particular box traceable through the entire process. The document widget may also be used in the shipping documents associated to that mail package.

EXAMPLE 6

A document can be created which contains the lyrics of a song. A first document widget (an author widget) can be provided in the document which has a human-readable portion comprising the letter "A" and a machine-readable portion comprising encoded information about the author of the lyrics. Also, a second document widget (a music widget) can be provided in the document which has a human-readable portion comprising a symbol for a musical note (for example, a "♪") and a machine-readable portion comprising encoded information about the music composition for the lyrics. Thus, a user can scan the document and be provided access to the music composition or other lyrics composed by the author.

Other potential applications of widgets include: interactive books, product and customer support information on packaging labels, personal information on boarding passes/tickets/business cards, document track-and-trace using unique ID, URL information and multimedia links in web-printing, applications like simple internet prints (SIPs) so that paper documents stay 'connected' to the web even after printing, automated re-entry of data from filled forms, secure information on confidential documents, and other intelligent processing applications for paper documents.

It should also be appreciated that a conventional camera or scanner may be used to capture an image of a document for transmission. The captured image can then be provided to a computer or other processing device which is adapted to detect and decode a document widget present in the image and extract/use document information represented by the document widget.

Figure 6:
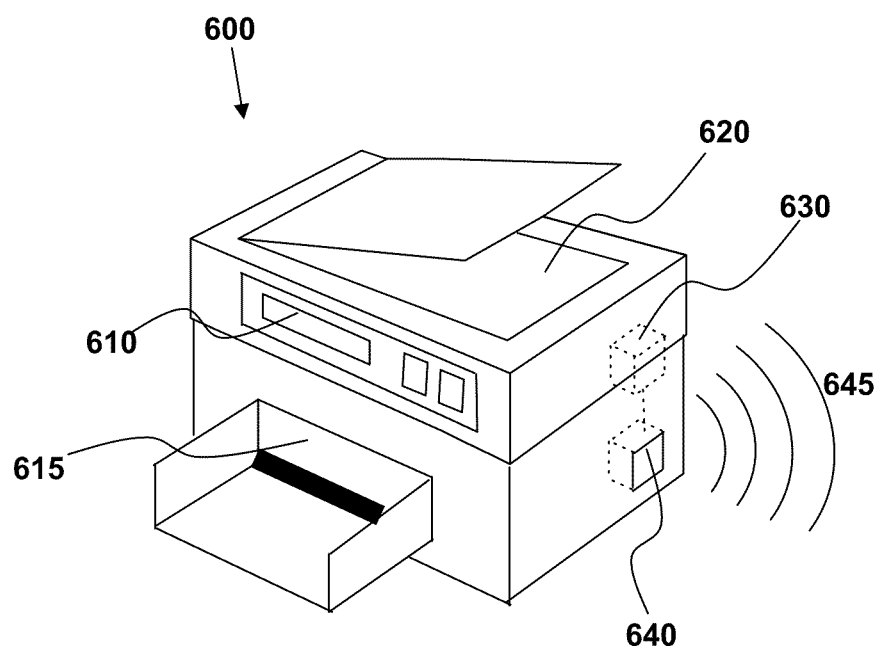
FIG. 6 shows a printer according to an embodiment.

Referring now to FIG. 6, a printer 600 according to an embodiment will now be described. The printer 600 comprises a user interface 610 adapted to receive a user input defining document properties such as details of the author, a summary of its contents, and/or location(s) of one or more data fields in the document. Based on the user input, document widget generation means (not visible) integrated within printer are adapted to generate one or more document widgets representing the user input(s). The printer is adapted to print the document widget(s) using the conventional printing means 615 of the printer. Such a document widget is adapted to be processed in accordance with an optical recognition process so as to identify the document information represented by the document widget.

It will be understood that the printer of FIG. 6 can therefore provide a pre-prepared item of stationery comprising a document widget representing information regarding a document to be made using the item of stationery. The document widget is adapted to be processed in accordance with an optical recognition process so as to identify document information and instruct a processing unit regarding details of the document. The pre-addressed item of stationery may comprise a signature or message portion, such a blank area, within which information is to be provided by a user. The location of the signature or message portion may then be encoded by the machine readable code portion of the document widget, thereby enabling the automatic identification and extraction of information entered into the signature or message portion by a user.

Referring back to FIG. 6, the printer 600 also comprises a document scanning unit 620 adapted to scan a document placed thereon so as to generate an electronic representation of the document. The electronic representation of the document is provided to a document widget processing unit 630 integrated within the printer 600 and adapted to detect and decode a document widget in accordance with an embodiment.

The document widget processing unit 630 identifies the existence of a document widget within an electronic representation provided to it and then determines document information encoded by a machine readable portion of a detected document widget. Determination of the document information is, for example, undertaken as described above in the section entitled "Document Widget Decoding".

The document widget processing unit 630 is also connected to a communication unit 640 integrated within the printer 600. The communication unit 640 is adapted to provide access to the internet via a wireless communication link 645, wherein an electronic representation of a document scanned by the printer can be communicated to another computing device via the internet. The communication unit 640 may access an internet address, email address or URL provided to it from the document widget processing unit 630. Alternatively, a user of the printer may be prompted, via the user interface, to confirm whether or not an address identified by the document widget processing unit 630 is to be used or accessed.

In this regard, the user may use the user interface to modify, add, delete or correct document information represented by a document widget. A user may therefore correct or update an address, location or other document-related information identified by a document widget, and information about the new or updated information may be stored within the printer so that future instances of the same document widget stamp result in the correct/updated information being identified by the document widget processing unit 630.

Thus, it will be understood that the printer 600 can be used with smart paper or stationery comprising a document widget so as to identify document information and to extract the document information from the document widget.

Figure 7:
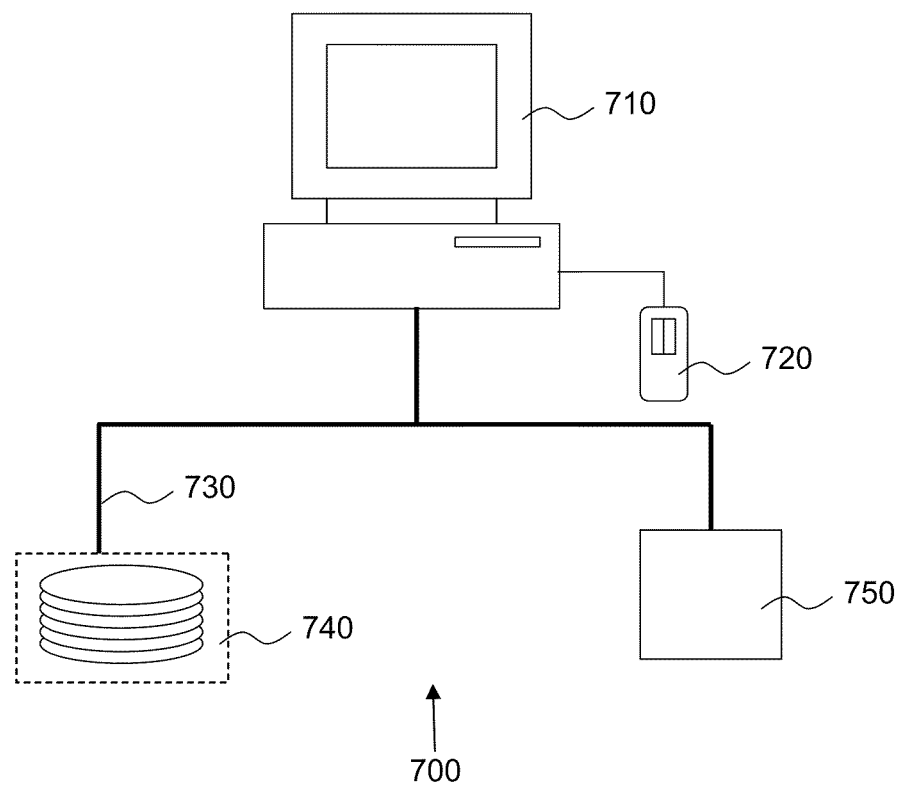
FIG. 7 shows a data processing system according to an embodiment.

Turning now to FIG. 7, a data processing system 700 in accordance with an embodiment is shown. A computer 710 has a processor (not shown) and a control terminal 720 such as a mouse and/or a keyboard, and has access to an electronic database stored on a collection 740 of one or more storage devices, e.g. hard-disks or other suitable storage devices, and has access to a further data storage device 750, e.g. a RAM or ROM memory, a hard-disk, and so on, which comprises the computer program product implementing at least part of a method according to an embodiment. The processor of the computer 710 is suitable to execute the computer program product implementing a method in accordance with an embodiment. The computer 710 may access the collection 740 of one or more storage devices and/or the further data storage device 750 in any suitable manner, e.g. through a network 730, which may be an intranet, the Internet, a peer-to-peer network or any other suitable network. In an embodiment, the further data storage device 750 is integrated in the computer 710.

Experimental Evaluation

Extensive testing of document widgets has been carried out over a test set comprising business forms, invoices, and purchase orders. As a test of robustness, three different document background shades were used—white, light, and dark backgrounds. In total, two hundred document widgets on thirty five different documents with different background shades were encoded, extracted, and decoded.

No extraction failures (false negatives or false positives) were encountered, which suggests that widget extraction according to an embodiment is robust. Further, widget decoding was also shown to be robust since the percentage of data bytes being incorrectly decoded was found to less than 1%.

The experiments demonstrated that document widgets could be easily be positioned within a document, whereas conventional machine readable codes were of a larger size meaning that they could only be placed in a restricted number of document locations (such as in isolated spaces or document margins).

It will be appreciated that embodiments provide advantages which can be summarized as follows:

Document widgets according to embodiments comprise human-readable content (for example, text or icons) which makes it possible for a human user to interpret the function of the widget. For instance, the human-readable portion of an email widget may be symbol "@". This provides context and meaning to a human reader, and makes the document widget amenable for usage with hand-held scanning devices where one can decide the machine-readable information they desire to extract from a document by looking at the human-readable elements on the widget.

Document widget according to embodiments may be adapted to be easy to detect and extract from a printed document, and hence the extraction process can be embedded within a scanning devices or scanning software. Document widgets may be small in size (when compared to conventional machine readable codes such as barcodes) so that they can be placed anywhere on the paper document and in close proximity to relative contents of interest. This may be referred to as distributed placement. Distributed placement can also lead to higher overall reliability since even if one document widget cannot be decoded, the rest of the information on the document can still be determined.

Document widgets according to an embodiment may have adequate data capacity so that they can capture machine readable information that would be useful while processing the paper document. For instance, the information could be the relative coordinates of a data field from which data/information is to be extracted from a document. Since document widgets may comprise a human-readable portion, a namespace around them can be defined so that different sets of widgets can be used as appropriate for different applications. Based on the type of widget, the way information is encoded can be determined.

It should be noted that the above-mentioned embodiments are illustrative, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. Embodiments can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for preparing a document to be processed, the method comprising;
specifying a property of the document; and
generating a document widget representing the specified document property, the document widget comprising: a human-readable portion for interpretation by a user and a machine-readable portion including a Binary Constrained Double-triangular Toeplitz (BCDT) structure that encodes the specified document property,
wherein the document widget is adapted to be processed in accordance with an optical recognition process so as to identify the document widget and enable extraction of the specified document property.

2. A method of processing a document, the method comprising the steps of:
processing an electronic representation of the document in accordance with an optical recognition process so as to detect the presence of a document widget in the electronic representation of the document, the document widget comprising: a human-readable portion for interpretation by a user and a machine-readable portion including a Binary Constrained Double-triangular Toeplitz (BCDT) structure that encodes a document property; and
processing the detected document widget to extract the document property represented by the machine-readable portion of the document widget.

3. The method of claim 1, further comprising:
providing the document.

4. The method of claim 1, wherein the human readable portion of the document widget comprised at least one of: an image, an icon and an alphanumeric character.

5. The method of claim 1, wherein the document property comprises at least one of: an author of content of the document; the location of information within the document; information content of the document; and a creation date of the document.

6. Apparatus for preparing a document to be processed, the apparatus comprising:
a user interface adapted to specify a property of the document; and
a document widget generating unit adapted to generate a document widget representing the specified document property, the document widget comprising: a human-readable portion for interpretation by a user and a machine-readable portion including a Binary Constrained Double-triangular Toeplitz (BCDT) structure that encodes the specified document property,
wherein the document widget is adapted to be processed in accordance with an optical recognition process so as to identify the document widget and enable extraction of the specified document property.

7. Apparatus for processing a document, the apparatus comprising:
a document widget detection unit adapted to process an electronic representation of the document in accordance with an optical recognition process so as to detect the presence of a document widget in the electronic representation of the document, the document widget comprising: a human-readable portion for interpretation by a user and a machine-readable portion including a Binary Constrained Double-triangular Toeplitz (BCDT) structure that encodes a document property; and
a document widget decoding unit adapted to extract the document property represented by the machine-readable portion of the document widget.

8. An image capture device comprising:
image capturing means adapted to generate an electronic representation of a document; and
apparatus for processing a document according to claim 7.

9. A printer comprising:
apparatus for processing a document according to claim 7; and
printing means adapted to print the document widget.

10. A pre-prepared document comprising a document widget representing a property of the document, the document widget comprising: a human-readable portion for interpretation by a user and a machine-readable portion including a Binary Constrained Double-triangular Toeplitz (BCDT) structure that encodes the document property,
and wherein the document widget is adapted to be processed in accordance with an optical recognition process so as to identify the document widget and enable extraction of the document property.

11. A pre-prepared document according to claim 10, further comprising an Information portion within which information is to be provided by a user of the document, and wherein the document property comprises the location of information portion within the document.

12. A non-transitory computer-readable data storage medium storing a computer program product arranged to, when executed on a computer, cause the computer to execute the steps of:
generating a document widget representing a specified document property, the document widget comprising: a human-readable portion for interpretation by a user and a machine-readable portion including a Binary Constrained Double-triangular Toeplitz (BCDT) structure that encodes the specified document property,
wherein the document widget is adapted to be processed in accordance with an optical recognition process so as to identify the document widget and enable extraction of the specified document property.

13. A non-transitory computer-readable data storage medium storing a computer program product arranged to, when executed on a computer, cause the computer to execute the steps of:
processing an electronic representation of a document in accordance with an optical recognition process so as to detect the presence of a document widget in the electronic representation of the document, the document widget comprising: a human-readable portion for interpretation by a user and a machine-readable portion including a Binary Constrained Double-triangular Toeplitz (BCDT) structure that encodes a document property; and
processing the detected document widget to extract the document property represented by the machine-readable portion of the document widget.

* * * * *

UNITED STATES PATENT AND TRADEMARK OFFICE
CERTIFICATE OF CORRECTION

PATENT NO.        : 8,593,697 B2                         Page 1 of 1
APPLICATION NO.   : 12/758813
DATED             : November 26, 2013
INVENTOR(S)       : Yogesh Sankarasubramaniam et al.

It is certified that error appears in the above-identified patent and that said Letters Patent is hereby corrected as shown below:

In the Claims:

In column 14, line 27, in Claim 11, delete "Information" and insert -- information --, therefor.

Signed and Sealed this
Fourth Day of March, 2014

Michelle K. Lee
*Deputy Director of the United States Patent and Trademark Office*